(12) United States Patent
Moon et al.

(10) Patent No.: US 11,753,297 B2
(45) Date of Patent: Sep. 12, 2023

(54) METHOD OF MANUFACTURING GLASS WITH HOLLOW NANOPILLARS AND GLASS WITH HOLLOW NANOPILLARS MANUFACTURED THEREBY

(71) Applicant: KOREA INSTITUTE OF SCIENCE AND TECHNOLOGY, Seoul (KR)

(72) Inventors: Myoung Woon Moon, Seoul (KR); Sun Mi Yoon, Seoul (KR); Young A Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 349 days.

(21) Appl. No.: 17/078,096

(22) Filed: Oct. 23, 2020

(65) Prior Publication Data

US 2021/0163285 A1 Jun. 3, 2021

(30) Foreign Application Priority Data

Nov. 29, 2019 (KR) .......... 10-2019-0156935

(51) Int. Cl.
*C03C 15/00* (2006.01)
*B82B 3/00* (2006.01)
*B82B 1/00* (2006.01)

(52) U.S. Cl.
CPC ............ *B82B 3/0019* (2013.01); *B82B 1/001* (2013.01); *C03C 15/00* (2013.01); *C03C 2218/33* (2013.01)

(58) Field of Classification Search
CPC ..... C03C 15/00; C03C 17/23; C03C 2218/33; C03C 2217/425; C03C 2217/75
See application file for complete search history.

(56) References Cited

U.S. PATENT DOCUMENTS

| 9,034,684 B2* | 5/2015 | Zhang ............... H01L 31/02366 438/712 |
| 2011/0033974 A1 | 2/2011 | Wang et al. |
| 2016/0002096 A1 | 1/2016 | Carrilero et al. |
| 2016/0326048 A1* | 11/2016 | Moon .................. B81C 1/00031 |

FOREIGN PATENT DOCUMENTS

| JP | 2003045320 A | 2/2003 |
| KR | 101529528 B1 | 6/2015 |

OTHER PUBLICATIONS

Korean Office Action for KR Application No. 10-2019-0156935 dated Nov. 20, 2020, citing the above reference(s).

(Continued)

*Primary Examiner* — Binh X Tran
(74) *Attorney, Agent, or Firm* — CANTOR COLBURN LLP (57) ABSTRACT

The present invention relates to: a method of manufacturing glass with hollow nanopillars, which includes a silicon oxide layer forming step in which a silicon oxide layer made of silicon oxide is formed on one side of a glass substrate, a first etching step in which the silicon oxide layer is etched and a plurality of silicon oxide clusters are formed on the glass substrate, and a second etching step in which the glass substrate, on which the silicon oxide clusters are formed, is etched and hollow nanopillars are formed; and glass with hollow nanopillars manufactured thereby.

13 Claims, 11 Drawing Sheets

(7 of 11 Drawing Sheet(s) Filed in Color)

(56) References Cited

OTHER PUBLICATIONS

The Extended European Search Report for EP Application No. 20203055.7 dated Mar. 31, 2021, citing the above reference(s).
Domenico Tulli et al., "Monolithically Integrated Micro- and Nanostructured Glass Surface with Antiglare, Antireflection, and Superhydrophobic Properties," ACS Appl. Mater. Interfaces, Jun. 24, 2014, pp. 11198-11203, American Chemical Society.
Joonsik Park et al., "Design and fabrication of a superhydrophobic glass surface with micro-network of nanopillars," Journal of Colloid and Interface Science, 2011, pp. 272-279, vol. 360, Elsevier Inc.
Seungmuk Ji et al., "Optimal Moth Eye Nanostructure Array on Transparent Glass Towards Broadband Antireflection," ACS Appl. Mater. Interfaces, Oct. 11, 2013, pp. 10731-10737, American Chemical Society.

\* cited by examiner

METHOD OF MANUFACTURING GLASS WITH HOLLOW NANOPILLARS AND GLASS WITH HOLLOW NANOPILLARS MANUFACTURED THEREBY

CROSS-REFERENCE TO RELATED APPLICATION

This application claims priority to and the benefit of Korean Patent Application No. 2019-0156935, filed on Nov. 29, 2019, the disclosure of which is incorporated herein by reference in its entirety.

BACKGROUND

Field of the Invention

The present invention relates to a method of manufacturing glass with hollow nanopillars and glass with hollow nanopillars manufactured thereby.

Discussion of Related Art

Glass, which has high transparency by having high light transmissivity and low reflectance, has been widely used in various fields such as displays for various mobile devices (e.g., state-of-the-art smart devices), home appliances, automobiles, aviation, and the interior and exterior glass of buildings and home appliances, and research attempts have been made to impart various functions such as fingerprint resistance, anti-fogging properties for suppressing the formation of water droplets, and the like to the surface of glass.

In order to impart hydrophobicity or water repellency to a glass surface, or to lower the light reflectance thereof, a method of forming a new surface structure by etching or coating the glass surface has been attempted. However, since glass is composed of various constituent materials, there is a tendency that it is not easily etched under general etching conditions. Although attempts have been made to etch a glass surface using toxic solutions such as hydrofluoric acid (HF), it is known that it is not easy to form a specific nanometer-sized pattern on a glass surface even with techniques using these toxic materials.

As representative techniques for forming a glass surface with increased hydrophobicity and reduced reflectance, methods such as a method of forming a mask by effectively dispersing particles on a glass surface and performing plasma etching on the resultant structure and a method of forming a nanostructure by spraying and fixing particles onto a glass surface have been applied.

Since the method of performing etching while applying a mask on a surface forms nanostructures on the glass surface itself, it has the advantage of excellent durability and the ability to adjust the size of nanopillars by controlling etching process conditions. However, it is not easy to uniformly disperse particles on a flat glass surface, and a step is added to the overall process due to the hassle of removing particle residues after etching, and a process using toxic materials to remove particles remaining on the surface is required. [Joonsik Park, Hyuneui Lim, Wandoo Kim, Jong Soo Ko, Journal of Colloid and Interface Science, 360, 272 (2011)] Furthermore, there are many difficulties in applying this process to curved glass, for which demand has been increasing recently.

According to recent research results, in order to increase the clarity or transmissivity of glass, it is required that nanostructures formed on a glass surface have a refractive index that gradually changes from upper portions to lower portions. Specifically, it is required that the upper portions of a nanostructure formed on the glass surface have a refractive index of about 1.0, which corresponds to the refractive index of air, and the refractive index is gradually increased toward the lower portions of the nanostructure so that the refractive index of the lower portion is maintained at about 1.5, which corresponds to the refractive index of glass. In particular, it is considered very important that in portions of a glass surface where nanostructures are present, the refractive index gradually changes from upper portions to lower portions. [Tulli, D.; Hart, S. D.; Mazumder, P.; Carrilero, A.; Tian, L.; Koch, K. W.; Yongsunthon, R.; Piech, G. A.; Pruneri, V. Monolithically Integrated Micro- and Nanostructured Glass Surface with Antiglare, Antireflection, and Superhydrophobic Properties. ACS Appl. Mater. Interfaces 2014, 6 (14), 11198-11203. https://doi.org/10.1021/am5013062]

SUMMARY OF THE INVENTION

The present invention is directed to providing a method of manufacturing glass with hollow nanopillars, which is capable of realizing low light reflectance and superhydrophilicity by forming hollow nanopillars on a glass surface using a multi-step etching process, and glass with hollow nanopillars manufactured thereby.

One aspect of the present invention provides a method of manufacturing glass with hollow nanopillars, which includes: a silicon oxide layer forming step in which a silicon oxide layer made of silicon oxide is formed on one side of a glass substrate; a first etching step in which the silicon oxide layer is etched and a plurality of silicon oxide clusters are formed on the glass substrate; and a second etching step in which the glass substrate, on which the silicon oxide clusters have been formed, is etched and hollow nanopillars are formed.

Another aspect of the present invention provides glass with hollow nanopillars, which is manufactured using the above-described manufacturing method.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

In this specification, when it is stated that a first member is positioned "on" or "above" a second member, this includes not only the case where the first member is in contact with the second member, but also the case where there is a third member present between the first and second members.

In this specification, when it is stated that a part "includes," "comprises," or "contains" a component, this means that the part may further include, rather than excluding, other components unless stated explicitly to the contrary.

Hereinafter, the present invention will be described in detail.

One aspect of the present invention provides a method of manufacturing glass with hollow nanopillars, which includes: a silicon oxide layer forming step in which a silicon oxide layer made of silicon oxide is formed on one side of a glass substrate; a first etching step in which a plurality of silicon oxide clusters are formed on the glass substrate by etching the silicon oxide layer; and a second etching step in which hollow nanopillars are formed by etching the glass substrate on which the silicon oxide clusters have been formed.

The silicon oxide layer may serve as a sacrificial layer in the first etching step and/or the second etching step and thereby enable hollow nanopillars to be formed on the surface of the glass substrate.

The glass substrate may be typical soda-lime glass, but the present invention is not limited thereto, and any of various types of glass used as a glass substrate in the art may be used.

According to one embodiment of the present invention, the silicon oxide layer may be formed using one or more processes selected from the group consisting of sputtering, plasma-enhanced chemical vapor deposition (PECVD), e-beam evaporation, and thermal evaporation processes. Specifically, according to one embodiment of the present invention, the silicon oxide layer may be a deposition layer made of $SiO_2$.

The silicon oxide layer may be formed using PECVD. In this case, a mixed gas prepared by mixing a nitrogen compound and a silicon compound at a volume ratio of 1:5.5 to 1:48.8 may enter a plasma state to be deposited on the surface of the glass substrate. By using the mixed gas having the above-described mixing ratio, it is possible to uniformly form a silicon oxide layer in an inexpensive and simple method.

The silicon compound may be any one selected from the group consisting of $SiH_4$, HMDSO, and a combination thereof, and the nitrogen compound may be any one selected from the group consisting of $N_2O$, NO, and a combination thereof.

The silicon oxide layer forming step may be regarded as a preprocess step for the first etching step and the second etching step, and the first etching step and the second etching step for forming hollow nanopillars using the silicon oxide layer may be performed more selectively.

According to one embodiment of the present invention, the silicon oxide layer may be formed with a thickness of 50 nm or more and less than 500 nm. Specifically, the silicon oxide layer may be formed with a thickness of 100 nm or more and less than 500 nm, 100 nm or more and 400 nm or less, or 100 nm or more and 250 nm or less. When the thickness of the silicon oxide layer is less than 100 nm, since silicon oxide clusters are not formed in the first etching step, it may be difficult to form hollow nanopillars in the second etching step, and further, there may be a problem that the glass does not attain superhydrophilicity. On the other hand, when the thickness of the silicon oxide layer is 500 nm or more, the glass substrate may not be etched at all or may be insufficiently etched, and since structures resembling nano-projections rather than hollow nanopillars are formed, there may be a problem that it is difficult to realize a low optical refractive index.

According to one embodiment of the present invention, in the first etching step, cluster particles including silicon oxide may be formed in at least a part of the silicon oxide layer, and at least three adjacent cluster particles thereamong may form a silicon oxide cluster.

According to one embodiment of the present invention, in the second etching step, hollow nanopillars may be formed on the surface of the glass substrate while the cluster particles of the silicon oxide clusters are functioning as an etching mask.

In the first etching step, at least a part of the silicon oxide layer may be converted into cluster particles, and as the cluster particles two-dimensionally arranged on the glass substrate become adjacent to one another, silicon oxide clusters may be formed. The silicon oxide clusters have an empty space in central portions thereof, and due to having such characteristics, the clusters are capable of serving as an etching mask in the second etching step.

In the second etching step, selective etching is possible because the empty space in central portions of the silicon oxide clusters has a higher etching rate, and the surface of the glass substrate may attain the shape of hollow nanopillars.

The principle of selective etching is thought to be possible in the first and second etching steps due to the metal ions derived from a metal contained in a negative electrode or a chamber used for plasma treatment. When a metal which is a material of a negative electrode or a wall of a chamber is sputtered by the plasma particles of a reactive gas in a plasma state, metal (e.g., chromium, iron, nickel, etc.) ions are deposited on the silicon oxide layer, and as the metal ions are locally accumulated with the silicon oxide on the silicon oxide layer, clusters may be formed. Accordingly, since the part of the silicon oxide layer where clusters have formed has a low etching rate and the part of the silicon oxide layer where clusters have not been formed has a high etching rate, a difference in etching rate occurs. Therefore, the surface of the silicon oxide layer may cause such a difference in etching rate, and as a result, structures in the shape of hollow nanopillars may be formed on the glass substrate.

According to one embodiment of the present invention, the hollow nanopillar may be a structure formed by etching the glass substrate. The hollow nanopillar is a pillar-shaped structure having a continuous empty space running from the top of the structure toward the inside, and since the glass accordingly has an optical refractive index which gradually increases in a direction from the surface toward the inside, very low light reflectance is realized. Therefore, the glass with hollow nanopillars of the present invention realizes high transparency and high clarity.

According to one embodiment of the present invention, the height of the hollow nanopillar may be 10 nm or more and 200 nm or less. More specifically, the height of the hollow nanopillar may be 10 nm or more and 150 nm or less or 50 nm or more and 100 nm or less.

According to one embodiment of the present invention, the diameter of the hollow region of the hollow nanopillar may be 5 nm or more and less than 100 nm. Specifically, the diameter of the hollow region of the hollow nanopillar may be 5 nm or more and 50 nm or less, 5 nm or more and 25 nm or less, or 5 nm or more and 15 nm or less.

According to one embodiment of the present invention, the ratio of the outer diameter of the hollow nanopillar and the diameter of the hollow region may be in the range of 2:1 to 10:1. In addition, the aspect ratio (height divided by the diameter of bottom surface) of the hollow nanopillar may be in the range of 1 to 10.

According to one embodiment of the present invention, the first etching step and the second etching step may be performed in succession. Specifically, the first etching step and the second etching step may be performed in succession under the same etching conditions, and while carrying out the successive etching steps, silicon oxide clusters may be formed, and further, hollow nanopillars may be formed.

According to one embodiment of the present invention, in each of the first etching step and the second etching step, selective etching using a reactive gas may be performed. In this case, the reactive gas may include any one selected from the group consisting of $CF_4$, $CHF_3$, $C_2F_6$, $C_2Cl_2F_4$, $C_3F_8$, $C_4F_8$, $SF_6$, and a combination thereof. Specifically, $CF_4$ may be used as the reactive gas.

According to one embodiment of the present invention, in each of the first etching step and the second etching step, one or more methods selected from the group consisting of plasma etching, reactive ion etching, ion-milling, and electro discharge machining (EDM) methods may be used.

According to one embodiment of the present invention, in each of the first etching step and the second etching step, selective plasma etching using a reactive gas may be performed. In this case, the reactive gas may include any one selected from the group consisting of $CF_4$, $CHF_3$, $C_2F_6$, $C_2Cl_2F_4$, $C_3F_8$, $C_4F_8$, $SF_6$, and a combination thereof. Specifically, $CF_4$ may be used as the reactive gas.

In addition, according to one embodiment of the present invention, the selective plasma etching may be performed under conditions where a plasma acceleration voltage is in the range of −100 Vb to −1,000 Vb and plasma etching pressure is 1 Pa or more and 10 Pa or less. When the acceleration voltage is in the range of −100 Vb to −1,000 Vb, since the accelerating force of reactive-gas plasma particles can be appropriately adjusted, an etching process can be easily performed, and the desired hollow nanopillars can be formed. In addition, when the etching process is performed in the above-described etching pressure range, hollow nanopillars having low-reflection characteristics can be formed.

According to one embodiment of the present invention, the total etching time in the first etching step and the second etching step may be 10 seconds or more and 30 minutes or less. Specifically, the total etching time in the first etching step and the second etching step may be 5 minutes or more and 25 minutes or less. When the etching time is less than 10 seconds, the etching time is too short, and thus it may be difficult to form hollow nanopillars. On the other hand, when the etching time is more than 30 minutes, hollow nanopillars having a small height may be formed due to excessive etching, and further, since the walls surrounding hollows may be removed, it may be difficult to implement the shape of hollow nanopillars and thus realize superhydrophilicity.

Figure 1A:
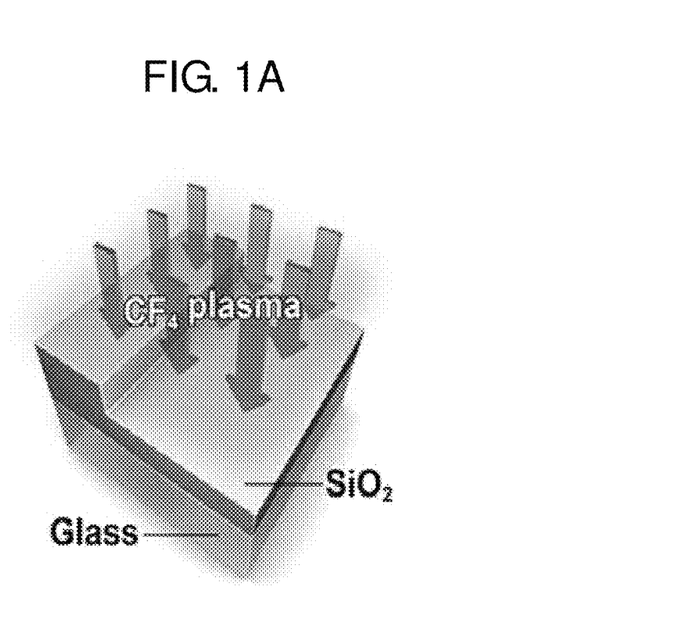
FIG. 1A to FIG. 1D are conceptual diagrams illustrating a method of manufacturing glass with hollow nanopillars according to one embodiment of the present invention.
Figure 1B:
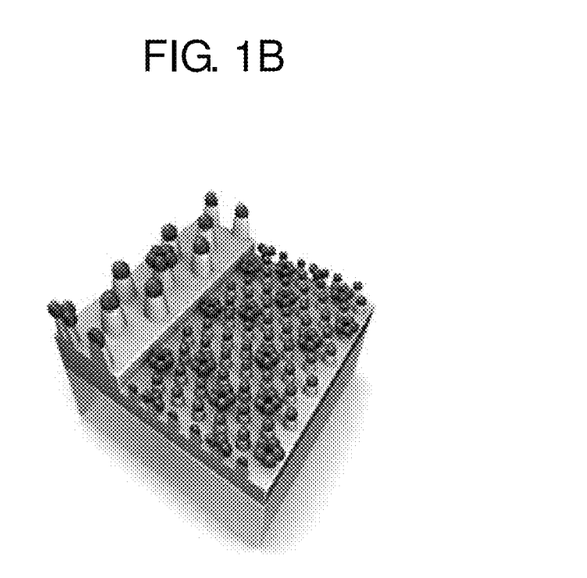
Figure 1C:
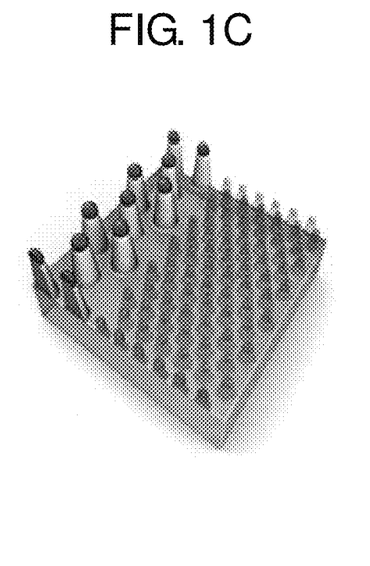
Figure 1D:
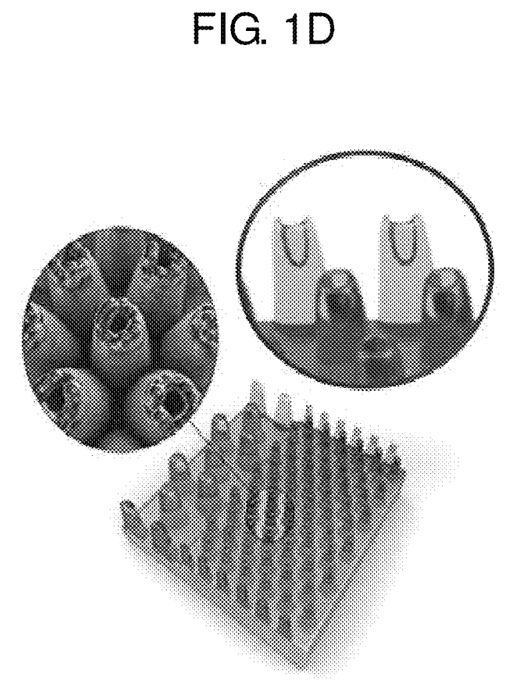

FIG. 1A to FIG. 1D are conceptual diagrams illustrating a method of manufacturing glass with hollow nanopillars according to one embodiment of the present invention. Specifically, FIG. 1A illustrates the etching process of the first etching step performed after forming a silicon oxide layer of a non-uniform thickness on soda-lime glass, FIG. 1B illustrates silicon oxide clusters formed on the silicon oxide layer after the first etching step, and FIGS. 1C and 1D illustrate hollow nanopillar-shaped structures formed through the second etching step. Referring to FIG. 1A to FIG. 1D, it is shown that in the region in which a relatively thick silicon oxide layer has formed, silicon oxide clusters are not easily formed through the first etching step, and therefore, hollow nanopillar-shaped structures are not formed even when the second etching is performed.

Another aspect of the present invention provides glass with hollow nanopillars manufactured by the above-described manufacturing method.

According to one embodiment of the present invention, the glass with hollow nanopillars may have a light reflectance of 5% or less. That is, in view of the fact that the existing general glass (i.e., soda-lime glass) has a reflectance of 8% to 10%, the glass with hollow nanopillars of present invention has considerably reduced reflectance.

Since the optical refractive index of the glass with hollow nanopillars according to one embodiment of the present invention gradually increases in a direction from the glass surface toward the inside due to the hollow nanopillars as described above, very low light reflectance can be realized. Accordingly, the glass with hollow nanopillars of the present invention may realize high transparency and high clarity.

When a droplet of pure water is in contact with a solid, a water contact angle refers to an angle between the surface of the solid and the inner surface of the droplet, and smaller water contact angles mean that the hydrophilicity of the solid surface being in contact with the water droplet is high. In general, a water contact angle of 10° or less indicates superhydrophilicity.

In addition, according to one embodiment of the present invention, the glass with hollow nanopillars may have a water contact angle of 10° or less. Since hollow nanopillars are uniformly formed throughout the glass with hollow nanopillars according to one embodiment of the present invention, superhydrophilicity resulting in a water contact angle of 10° or less can be realized, and accordingly, water coming into contact with the glass surface easily spreads even in the absence of a functional coating layer, and thus fogging is prevented. Therefore, when the glass with hollow nanopillars of the present invention is applied to ordinary eyeglasses or glass, fogging is prevented even at high humidity.

Hereinafter, the present invention will be described in detail by way of exemplary embodiments. However, the exemplary embodiments of the present invention may be modified and implemented into various different forms, and the scope of the present invention should not be construed as being limited to the exemplary embodiments described below. In this specification, the exemplary embodiments are provided to more completely describe the present invention to those of ordinary skill in the art.

EXAMPLE 1

By using a PECVD process, a 1:50 (v/v) mixture of $SiH_4$ and $N_2O$ gases entered a plasma state and was deposited onto each soda-lime glass, and thereby a $SiO_2$ layer was formed with a thickness of 100 nm.

Subsequently, each of the samples on which a $SiO_2$ layer having the above-described thickness had been formed was subjected to $CF_4$ plasma treatment for 1, 5, 15, or 30 minutes under the conditions of a bias voltage of −600 V and a deposition pressure of 30 mTorr, and thereby surface-treated glass was obtained. The $CF_4$ plasma treatment time may refer to the time for which the first etching step and the second etching step were performed in succession.

As a result, for all the $CF_4$ plasma treatment times applied in Example 1, hollow nanopillar-shaped structures were formed on the surface of soda-lime glass.

EXAMPLE 2

Surface-treated glass was manufactured in the same manner as in Example 1 except that a $SiO_2$ layer having a thickness of 250 nm was formed.

As a result, for all the $CF_4$ plasma treatment times applied in Example 2, hollow nanopillar-shaped structures were formed on the surface of soda-lime glass.

Figure 2:
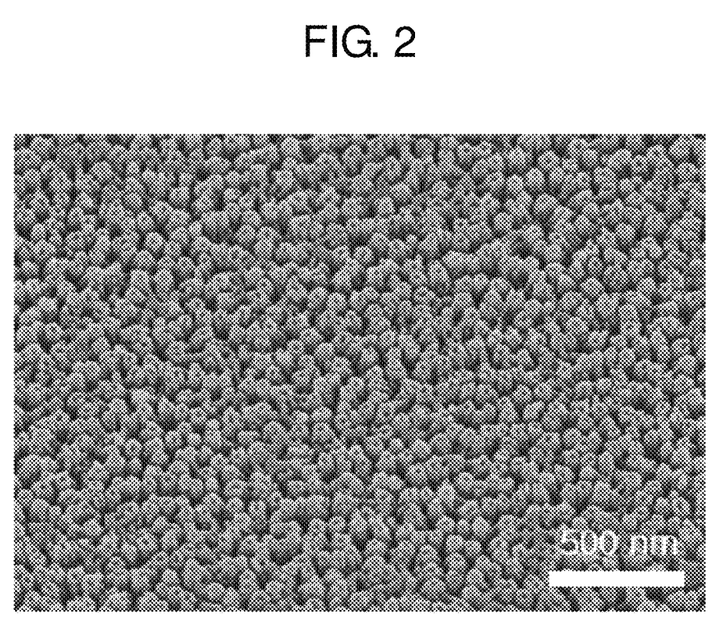
FIG. 2 is a scanning electron microscope (SEM) image showing the surface of the surface-treated glass of Example 2, which has been treated with $CF_4$ plasma for 15 minutes.
Figure 3:
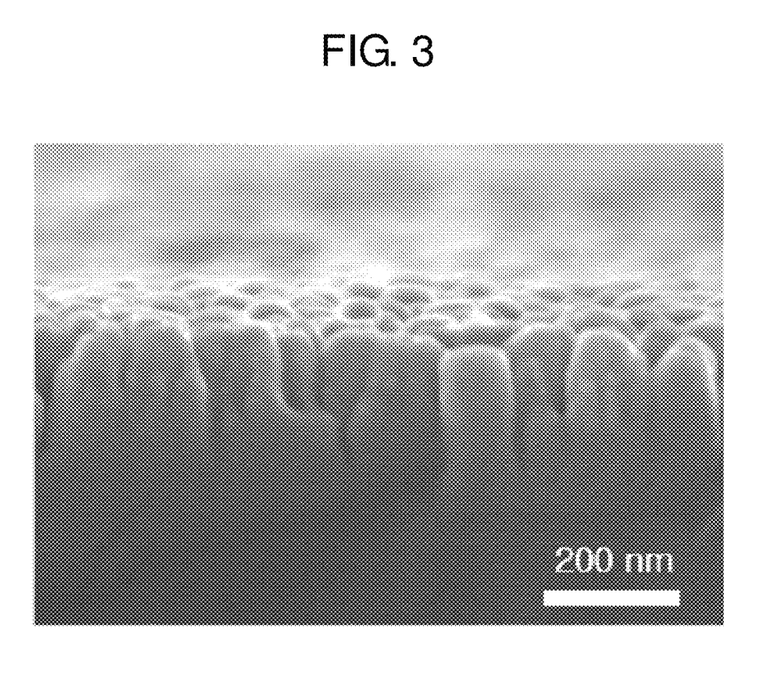
FIG. 3 is a SEM image showing the cross-section of the surface-treated glass of Example 2, which has been treated with $CF_4$ plasma for 15 minutes.

FIG. 2 is a SEM image showing the surface of the surface-treated glass of Example 2, which has been treated with $CF_4$ plasma for 15 minutes, and FIG. 3 is a SEM image showing the cross-section of the surface-treated glass of Example 2, which has been treated with $CF_4$ plasma for 15 minutes. Referring to FIGS. 2 and 3, it can be seen that hollow nanopillars having a height of 50 nm to 70 nm were formed on the surface of soda-lime glass at regular intervals.

COMPARATIVE EXAMPLE 1

Surface-treated glass was manufactured in the same manner as in Example 1 except that $CF_4$ plasma treatment was performed for 1, 5, 15, or 30 minutes after forming a $SiO_2$ layer having a thickness of 500 nm. In this case, unlike in Example 1, structures having the shape of nanoprojections rather than hollow nanopillars were formed on the surface of soda-lime glass.

COMPARATIVE EXAMPLE 2

Surface-treated glass was manufactured in the same manner as in Example 1 except that $CF_4$ plasma treatment was performed for 1, 5, 15, 30 or 60 minutes after forming a $SiO_2$ layer having a thickness of 1,000 nm. In this case, unlike in Example 1, structures having the shape of nanoprojections rather than hollow nanopillars were formed on the surface of soda-lime glass.

Figure 4:
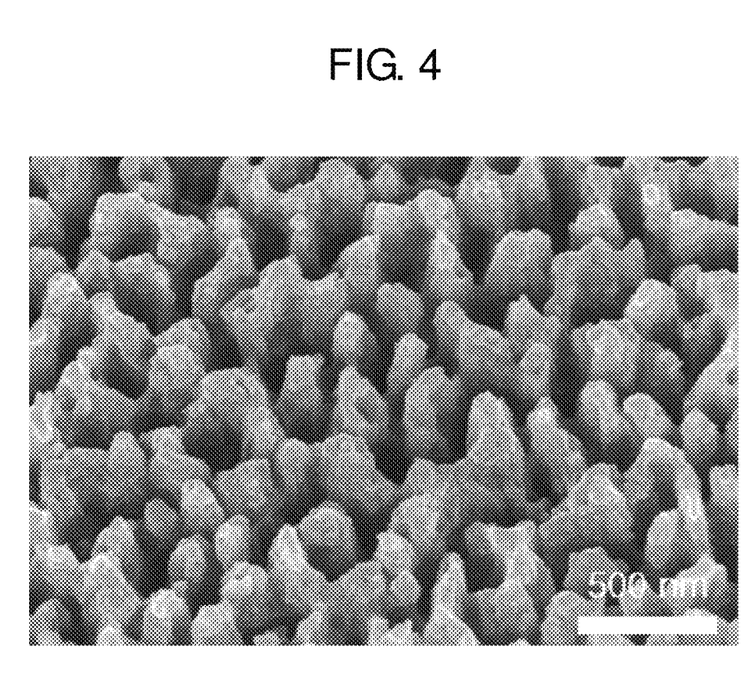
FIG. 4 is a SEM image showing the surface of the surface-treated glass of Comparative Example 2, which has been treated with $CF_4$ plasma for 60 minutes.
Figure 5:
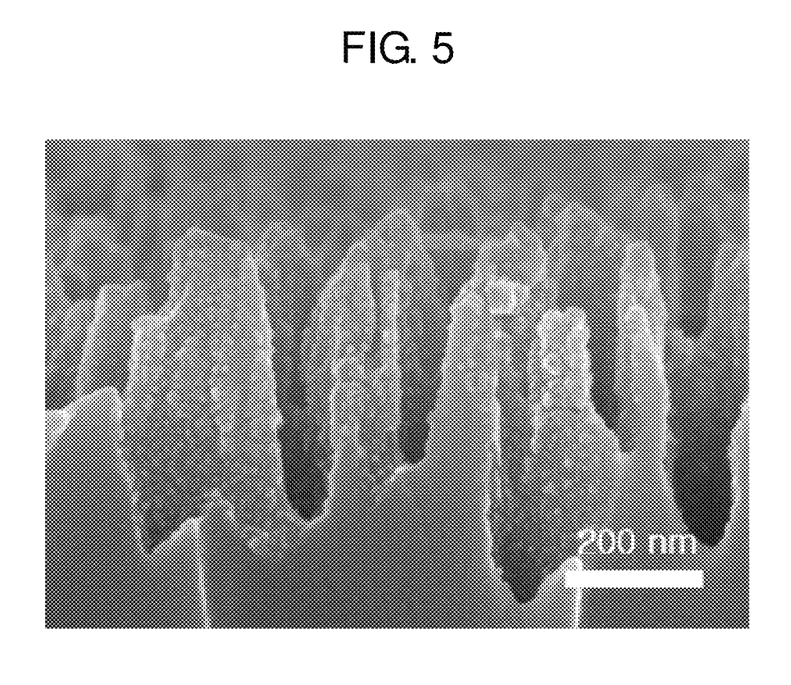
FIG. 5 is a SEM image showing the cross-section of the surface-treated glass of Comparative Example 2, which has been treated with $CF_4$ plasma for 60 minutes.

FIG. 4 is a SEM image showing the surface of the surface-treated glass of Comparative Example 2, which has been treated with $CF_4$ plasma for 60 minutes, and FIG. 5 is a SEM image showing the cross-section of the surface-treated glass of Comparative Example 2, which has been treated with $CF_4$ plasma for 60 minutes. Referring to FIGS. 4 and 5, it can be seen that structures having the shape of nanoprojections with a very high aspect ratio rather than hollow nanopillars were formed on the surface of soda-lime glass.

Figure 6:
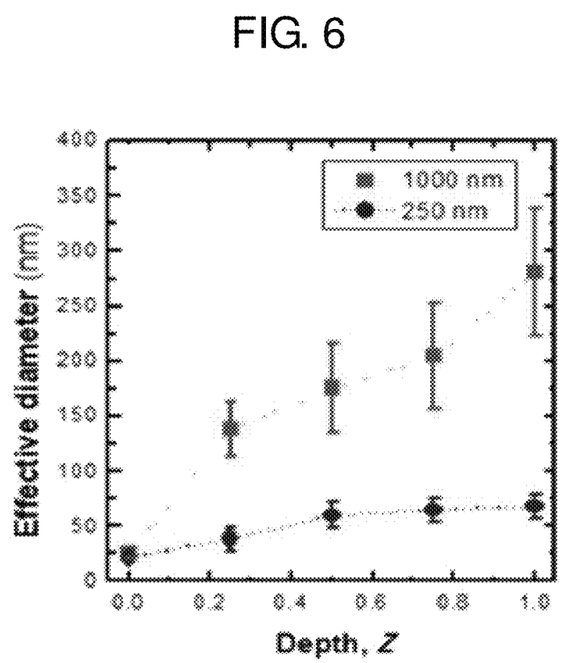
FIG. 6 is a graph showing a change in the width of the nanostructures of the surface-treated glass of Example 2 (i.e., 250 nm thick $SiO_2$ layer), which has been treated with $CF_4$ plasma for 15 minutes, and the surface-treated glass of Comparative Example 2 (i.e., 1,000 nm thick $SiO_2$ layer), which has been treated with $CF_4$ plasma for 60 minutes, in the depth direction.

FIG. 6 is a graph showing a change in the width of the nanostructures of the surface-treated glass of Example 2 (i.e., 250 nm thick $SiO_2$ layer), which has been treated with $CF_4$ plasma for 15 minutes, and the surface-treated glass of Comparative Example 2 (i.e., 1,000 nm thick $SiO_2$ layer), which has been treated with $CF_4$ plasma for 60 minutes, in the depth direction. It can be seen that in the case of Comparative Example 2 where the thickness of a $SiO_2$ layer is 1,000 nm, the etching (60-minute $CF_4$ plasma treatment) resulted in nanostructures whose width gradually increased in the direction from upper portions of the nanostructures (about 150 nm) toward lower portions (about 280 nm). In addition, it can be seen that in the case of Example 2 where the thickness of a $SiO_2$ layer is 250 nm, the etching (15-minute $CF_4$ plasma treatment) resulted in nanostructures whose width gradually increased in the direction from upper portions of the nanostructures (about 30 nm) toward lower portions (about 70 nm) and was about 50 nm on average.

Figure 7:
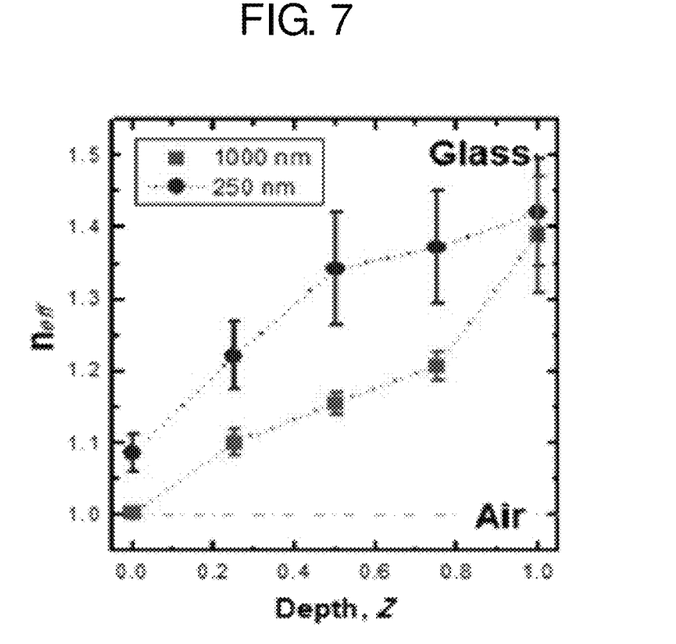
FIG. 7 is a graph showing the result of evaluating refractive indices based on the result of FIG. 6.

FIG. 7 is a graph showing the result of evaluating refractive indices based on the result of FIG. 6. In general, on surfaces having nanostructures, the effective medium theory applies for a refractive index. In FIG. 7, the refractive index was calculated using an equation disclosed in [Ji, S.; Song, K.; Nguyen, T. B.; Kim, N.; Lim, H. Optimal Moth Eye Nanostructure Array on Transparent Glass towards Broadband Antireflection. ACS Appl. Mater. Interfaces 2013, 5 (21), 10731-10737]. Referring to FIG. 7, it can be seen that the refractive index changes in a manner that is dependent on the thickness of a $SiO_2$ layer, and when the thickness of a $SiO_2$ layer is 1,000 nm, the refractive index, which is 1.0 similar to that of air at the surface of the $SiO_2$ layer, gradually increases to about 1.4 near the glass surface. However, it can be seen that as the shape of the nanostructures remarkably changes at a depth (z) of 0.75, the refractive index sharply increases in the depth direction. On the other hand, it can be seen that when the thickness is 250 nm, the refractive index gradually increases from 1.0 to 1.45. It can be seen that, although there is only a slight change in the width of the hollow nanopillars in the depth direction, since a change in refractive index due to the hollow structure is significant, the refractive index can be gradually and sufficiently changed despite the small thickness.

Figure 8:
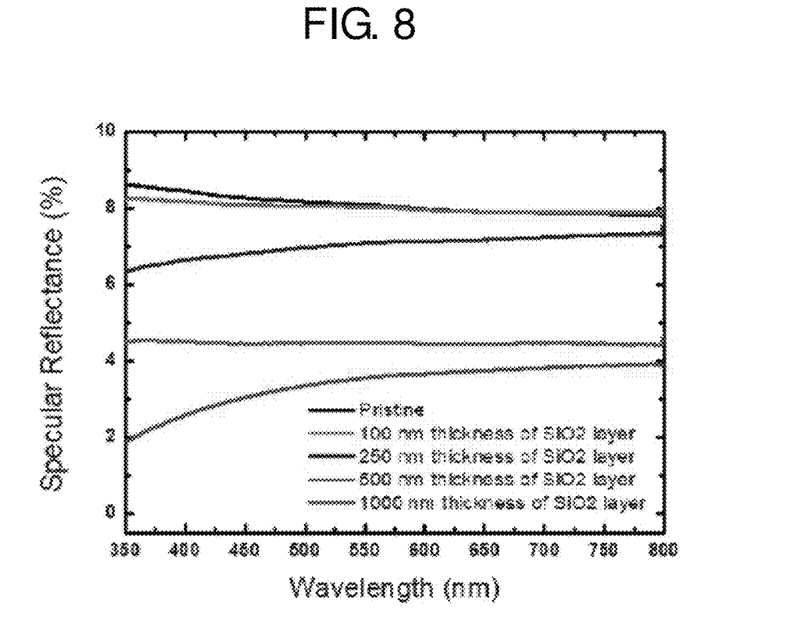
FIG. 8 shows the specular reflectance of the surface-treated glass of Examples and Comparative Examples according to the variation in thickness of a $SiO_2$ layer.

FIG. 8 shows the specular reflectance of the surface-treated glass of Examples and Comparative Examples according to the variation in thickness of a $SiO_2$ layer. Specular reflectance refers to the reflectance at an angle of reflection that is of the same magnitude as the angle of incident with respect to a surface on which light is incident. Referring to FIG. 8, it can be seen that as the size of nanostructures is increased due to the increase in the thickness of a $SiO_2$ layer, the reflectance gradually decreases.

Figure 9:
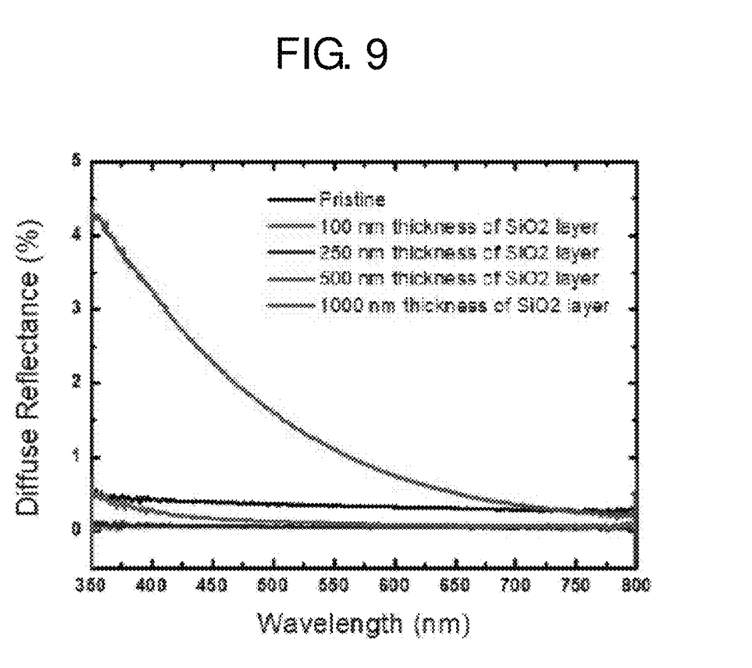
FIG. 9 shows the diffuse reflectance of the surface-treated glass of Examples and Comparative Examples according to the variation in thickness of a $SiO_2$ layer.

FIG. 9 shows the diffuse reflectance of the surface-treated glass of Examples and Comparative Examples according to the variation in thickness of a $SiO_2$ layer. Referring to FIG. 9, it can be seen that unlike the results shown in FIG. 8, the behavior of diffuse reflectance greatly varies according to the variation in thickness of the $SiO_2$ layer. Specifically, whereas when the thickness of a $SiO_2$ layer is in the range of 100 nm to 250 nm, the diffuse reflectance is very low, when the thickness of a $SiO_2$ layer is 1,000 nm, very high reflection characteristics compared to those of a general glass surface are exhibited. This is believed to be due to the fact that since the size of the nanostructure is 200 nm or more, light of small wavelengths is reflected in various directions.

Figure 10:
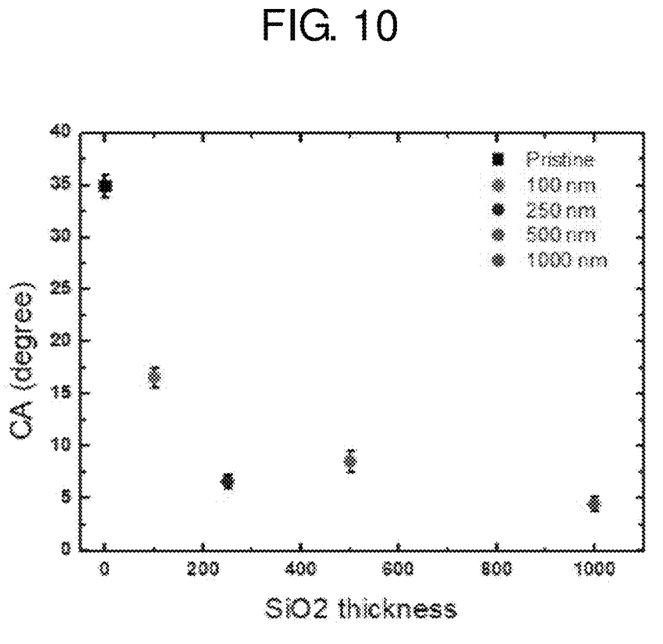
FIG. 10 shows the water contact angle of the surface-treated glass of Examples and Comparative Examples according to the variation in thickness of a $SiO_2$ layer.

FIG. 10 shows the water contact angle of the surface-treated glass of Examples and Comparative Examples according to the variation in thickness of a $SiO_2$ layer. Referring to FIG. 10, when the thickness of a $SiO_2$ layer is 100 nm, the water contact angle is reduced to about 17°, and when the thickness of a $SiO_2$ layer is greater than 200 nm, superhydrophilicity resulting in a water contact angle of less than 10° is realized.

According to the present invention, it is possible to manufacture glass with hollow nanopillars, which is glass having low light reflectance and superhydrophilicity without having an additional functional coating layer. In addition, since the glass with hollow nanopillars according to the present invention is manufactured by a simple process without using a harmful etchant, the manufacture thereof is economical and environmentally friendly. With the glass with hollow nanopillars according to the present invention, high transparency and high clarity are realized due to low light reflectance, and further, fogging is prevented due to superhydrophilicity. The glass with hollow nanopillars has the advantage that it can be variously applied to various fields such as advanced smart devices (e.g., foldable displays), the surfaces or glass of mobile transportation vehicles (e.g., automobiles), and home appliances, as well as existing uses of glass.

Other objectives and advantages of the present invention may be more clearly understood by the above detailed description of the invention, the accompanying drawings, and the scope of the following claims.

What is claimed is:

1. A method of manufacturing glass with hollow nanopillars, comprising:
   a silicon oxide layer forming step in which a silicon oxide layer made of silicon oxide is formed on one side of a glass substrate;
   a first etching step in which the silicon oxide layer is etched and a plurality of silicon oxide clusters are formed on the silicon oxide layer; and
   a second etching step wherein the silicon oxide layer and the glass substrate are etched and hollow nanopillars are formed,
   wherein the first etching step and the second etching step are performed in succession, and
   wherein the silicon oxide layer is formed with a thickness of 50 nm or more and less than 500 nm.

2. The method of claim 1, wherein, in the first etching step, cluster particles including silicon oxide are formed in at least a part of the silicon oxide layer, and at least three adjacent cluster particles thereamong form a silicon oxide cluster.

3. The method of claim 1, wherein, in the second etching step, hollow nanopillars are formed on the surface of the glass substrate while silicon oxide particles of the silicon oxide clusters are functioning as an etching mask.

4. The method of claim 1, wherein a height of the hollow nanopillar is 10 nm or more and 200 nm or less.

5. The method of claim 1, wherein a diameter of a hollow region of the hollow nanopillar is 5 nm or more and less than 100 nm.

6. The method of claim 1, wherein the silicon oxide layer is formed with a thickness of 100 nm or more and less than 500 nm.

7. The method of claim 1, wherein the silicon oxide layer is formed using one or more processes selected from the group consisting of sputtering, plasma-enhanced chemical vapor deposition (PECVD), e-beam evaporation, and thermal evaporation processes.

8. The method of claim 1, wherein, in each of the first etching step and the second etching step, one or more methods selected from the group consisting of plasma etching, reactive ion etching, ion-milling, and electro discharge machining (EDM) methods are used.

9. The method of claim 1, wherein the total etching time in the first etching step and the second etching step is 10 seconds or more and 30 minutes or less.

10. The method of claim 1, wherein in each of the first etching step and the second etching step, selective etching using a reactive gas is performed.

11. The method of claim 10, wherein the reactive gas includes any one selected from the group consisting of $CF_4$, $CHF_3$, $C_2F_6$, $C_2C_{12}F_4$, $C_3F_8$, $C_4F_8$, $SF_6$, and a combination thereof.

12. The method of claim 1, wherein, in each of the first etching step and the second etching step, selective plasma etching using a reactive gas is performed.

13. The method of claim 12, wherein the selective plasma etching is performed under conditions where a plasma acceleration voltage is in the range of −100 Vb to −1,000 Vb and plasma etching pressure is 1 Pa or more and 10 Pa or less.

* * * * *